Nov. 15, 1949 — H. E. GINGRICH — 2,488,285
CONNECTION FOR BRACING RODS
Filed April 2, 1946

Inventor
Hiram E. Gingrich
By R. S. C. Dougherty
Attorney

Patented Nov. 15, 1949

2,488,285

UNITED STATES PATENT OFFICE 2,488,285

CONNECTION FOR BRACING RODS

Hiram E. Gingrich, Bethlehem, Pa., assignor to Bethlehem Steel Company, a corporation of Pennsylvania Application April 2, 1946, Serial No. 659,044

6 Claims. (Cl. 287—20)

This invention relates to a connection for adjustable rod bracing used to plumb columns in the construction of gas holders, elevated water tanks and similar structures.

The usual method of providing adjustment for diagonals has been by means of turnbuckles placed between sections of round rods. In such construction it is customary to provide the ends of the rods with pinned clevises or other fittings, and the threaded ends of the rods are usually upset to a larger diameter than the rods in order to provide full rod strength in the threaded portions. This type of construction involves several fittings and considerable assembly for each diagonal member.

It is an object of this invention to eliminate the use of turnbuckles, clevises or similar fittings and to provide the adjustment by means of a single rod for each diagonal with threaded ends provided with ordinary nuts.

Another object of this invention is to provide a single threaded rod for diagonal bracing located on the center of the gusset plate so that eccentricity in the connection is eliminated.

Other advantages of my invention will hereinafter appear upon reference to the detailed description in connection with the accompanying sheet of drawings.

Figure 1:
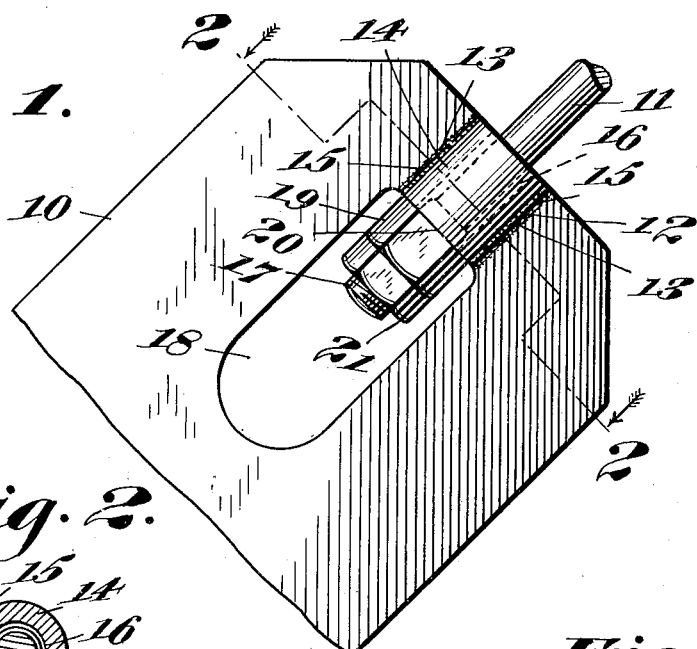
Figure 1 is a side elevation of the rod connection to the gusset plate through a welded annular sleeve.
Figure 2:
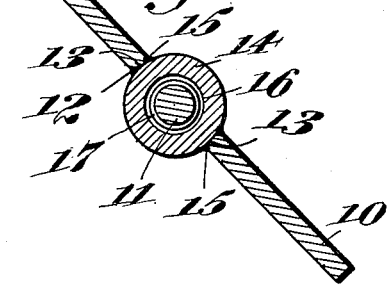
Figure 2 is a section on line 2—2 of Figure 1.

Referring now to the drawings, a gusset plate 10 to which a diagonal bracing rod 11 is to be attached has a rectangular recess 12 cut from one edge thereof. This recess or slot has parallel sides 13 to receive an annular sleeve 14 with an outside diameter only slightly less than the width of the slot. The sleeve is attached to the sides 13 by means of welds 15 so that the axis of the sleeve falls in the same plane as the center line of the gusset plate. The inner diameter 16 of the sleeve is of a size to permit the upset threaded portion 17 to pass through. Below and adjoining the recess 12 a portion of the gusset plate 10 is cut out to form an opening 18 of such size and shape as to allow the nut 19 to be placed upon the threaded portion 17 and to come into contact with the inner end 20 of the sleeve 14. A jam nut 21 may be used when required.

Figure 3:
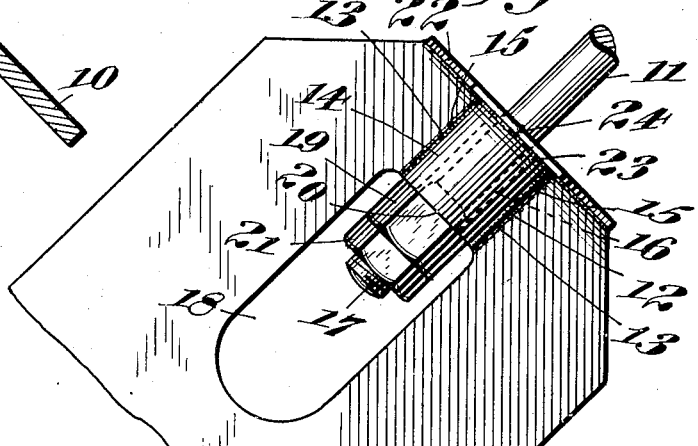
Figure 3 shows a view similar to Figure 1 but with a cover plate applied to the outer end of the sleeve.
Figure 4:
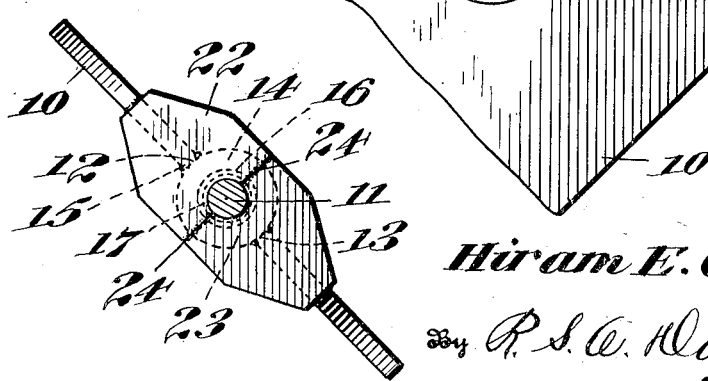
Figure 4 is a top view of the cover plate in Figure 3 showing the plate fitting closely around the rod.

In Figures 3 and 4, a cover plate 22 is applied to the outer end 23 of the sleeve 14, which fits closely around the rod but is not attached thereto. This cover plate 22 is welded to the outer diameter of the sleeve and also to the top edge of the gusset plate. When the rod is upset at the ends it will be necessary to furnish the cover plate in two pieces and weld them together along the line 24 to provide a close fit around the rod. This cover plate serves a valuable purpose in that it removes the point of maximum bending stress from the weld attaching the sleeve to the gusset plate, to the cover plate. At the lower end of the rod the space between the rod and the inner wall of the sleeve should be filled with water-proof compound before attaching the cover plate.

While I have shown a round rod with upset threaded ends provided with nuts I do not wish to be so restricted but it should be understood that round rods without upset ends, or square rods with or without upsets, flat bars or any other shape may be used without departing from the spirit of my invention. Also the fastening means on the rod should not be limited to threaded nuts but adjustable keys or wedges may be used.

The invention is not to be limited by the particular embodiment thereof illustrated by the drawings as various other forms will be apparent to those skilled in the art without departing from the spirit of the invention or the scope of the following claims.

Having thus described my invention, what I claim as new and desire to secure by Letters Patent is:

1. In a structure, a gusset plate having a thickened portion with an opening adjacent the thickened portion, said thickened portion having an opening therethrough disposed centrally with respect to the gusset plate and communicating with the opening therein, fastening means disposed in the opening in the gusset plate, and a rod passing through the opening in the thickened portion engaging the fastening means.

2. In a structure, a gusset plate having a slot extending from its edge, and a socket welded in said slot extending down the slot to a point short of the bottom thereof.

3. In a structure, a gusset plate having a slot extending from its edge, a socket welded in said slot extending down the slot to a point short of the bottom thereof, and a reinforcing plate disposed at right angles to the gusset plate and welded to the edge thereof and to the socket.

4. In a structure, a gusset plate having a slot extending from its edge, a socket welded in said slot extending down the slot to a point short of the bottom thereof and disposed centrally with respect to the gusset plate, a reinforcing plate disposed at right angles to the gusset plate and welded to the edge thereof and to the socket, fastening means positioned between the bottom of the slot and the socket, and a rod passing through the socket and engaging the fastening means.

5. In a structure, a gusset plate having a slot extending from its edge, a socket attached in said slot to a point short of the bottom thereof and disposed centrally with respect to the gusset plate, a tension member passing through the socket and engaging an adjustable fastening means positioned between the bottom of the slot and the socket.

6. In a structure, a gusset plate having a slot extending from its edge, a socket attached in said slot to a point short of the bottom thereof and disposed centrally with respect to the gusset plate, a reinforcing plate disposed at right angles to the gusset plate and welded to the edge thereof and to the socket, a tension member passing through the socket and engaging an adjustable fastening means positioned between the bottom of the slot and the socket.

HIRAM E. GINGRICH.

REFERENCES CITED

The following references are of record in the file of this patent:

UNITED STATES PATENTS

| Number | Name | Date |
|---|---|---|
| 338,811 | Whittaker | Mar. 30, 1886 |
| 417,804 | Bates | Dec. 24, 1889 |
| 843,179 | Rodney | Feb. 5, 1907 |
| 1,359,391 | Landymore | Nov. 16, 1920 |
| 1,544,548 | Barnes | July 7, 1925 |
| 1,878,055 | Wittlitt | Sept. 20, 1932 |
| 2,076,106 | Wehr | Apr. 6, 1937 |
| 2,331,825 | Clapp | Oct. 12, 1943 |